June 30, 1936.   J. F. PAULSEN ET AL   2,046,208
RESILIENT TRANSMISSION DISK
Filed Dec. 24, 1935   3 Sheets-Sheet 1

Inventors:
J. F. Paulsen &
N. Strachovsky
By: Glascock Downing Seebold
Attys.

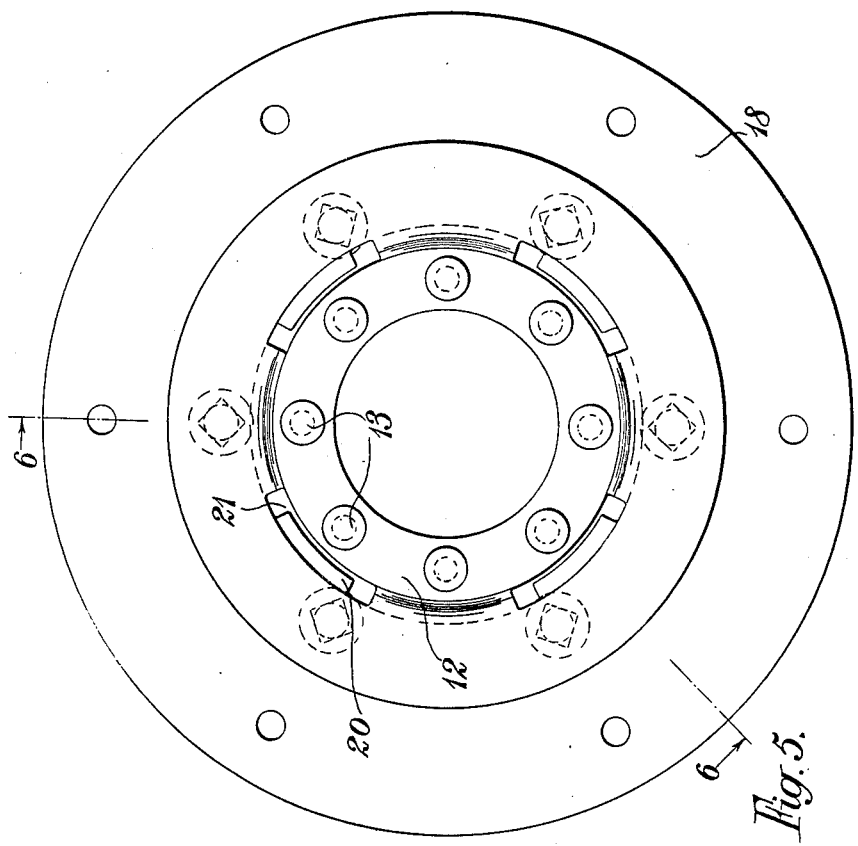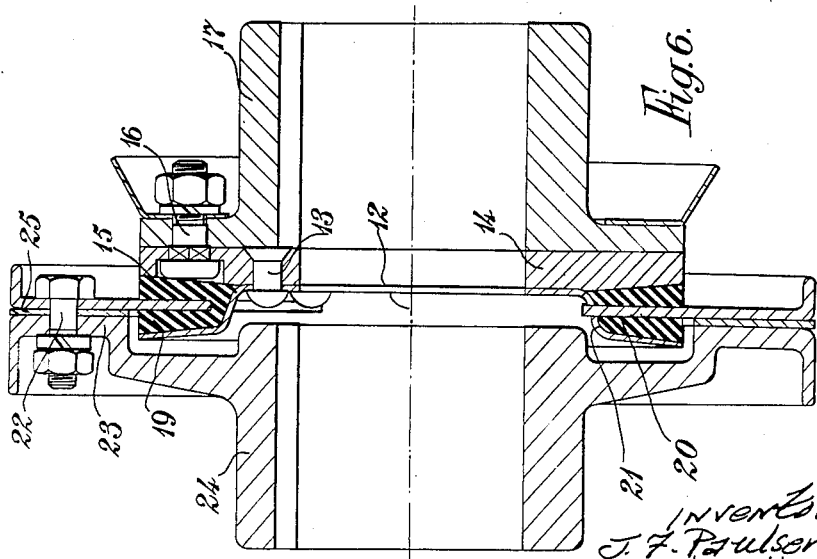

Patented June 30, 1936

2,046,208

UNITED STATES PATENT OFFICE 2,046,208

RESILIENT TRANSMISSION DISK

Jean Felix Paulsen, Viroflay, and Nikita Strachovsky, Paris, France

Application December 24, 1935, Serial No. 56,126
In Great Britain December 1, 1934

3 Claims. (Cl. 64—11)

This invention relates to resilient transmission disks or couplings and has for its object to prevent the occurrence or propagation of certain vibratory phenomena which causes noise, shocks and other oscillatory effects of a destructive or harmful character.

These phenomena, amongst others, usually occur in systems designed to transmit rotary motion, and the prevention of their propagation can, therefore, be attained by an elastic connection in the transmission.

In some cases it is sufficient to provide this connection with a degree of angular elasticity which is sufficient to filter the worst of the vibrations, and in other cases the angular elasticity must be sufficient to absorb vibrations in their entirety.

These undesirable vibrations may be classified as follows—

I.—Axial vibrations due to—
(a) irregularity of thrust;
(b) defects of alignment.

II.—Radial vibrations due to—
(c) driving and driven members being off centre in respect to each other;
(d) defects of alignment.

III.—Angular vibrations due to—
(e) irregularities of torque;
(f) irregularities of rotational speed.

It will be appreciated that in order to satisfy all requirements pertaining to the filtering or absorbing vibrations in rotary transmission systems, the device designed to do so must possess a sufficient degree of elasticity in three directions, viz. longitudinally, transversely and tangentially.

Having thus determined the chief characteristics for a device intended to absorb or filter rotary transmission vibrations, it remains now to find the best location for it in transmission systems.

It is obvious that defects of alignment or centre occur most frequently in all sorts of couplings, whether of the clutch or permanent types. It therefore follows that the location for a vibration absorbing or filtering device of the type referred to above, must be within such couplings.

The resilient transmission disk or couplings forming the subject matter of the present invention, having been conceived with due regard to the foregoing stipulations, fulfils their technical requirements, and thus represents a device capable of absorbing or filtering axial, radial and angular vibrations inherent to rotary transmission systems.

The improved disk or coupling as will be more particularly described constitutes a component which is easily adaptable to most transmission system couplings of both clutch and permanent types.

Reference will now be made to the accompanying drawings in which—

Figure 5 is a side view of a modification of the resilient disk embodied in a coupling.

Figure 6 is a section on line 6—6 of Figure 5.

Figures 1, 2:
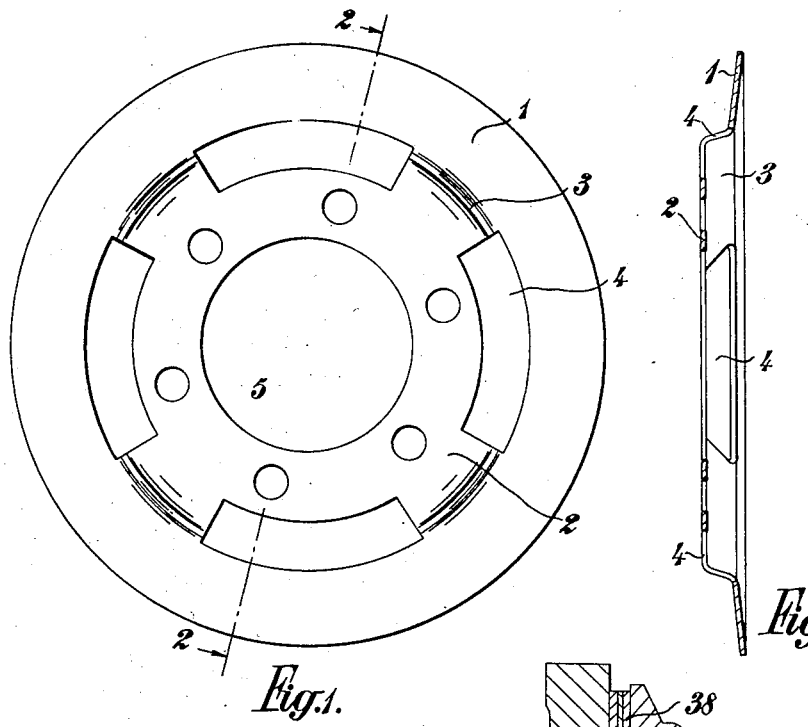
Figure 1 is a front elevation of one element of a resilient disk.
Figure 2 is a section on line 2—2 of Figure 1.

In Figures 1 and 2 there is shown one element of the resilient disk which comprises a dished plate having an outer rim portion 1, a central flat portion 2 and an annular portion 3. A number of segmental openings 4 are provided equidistantly arranged which extend from the central flat portion 2 into the annular portion 3 and terminate at the inner periphery of the outer rim portion 1.

Figures 3, 4:
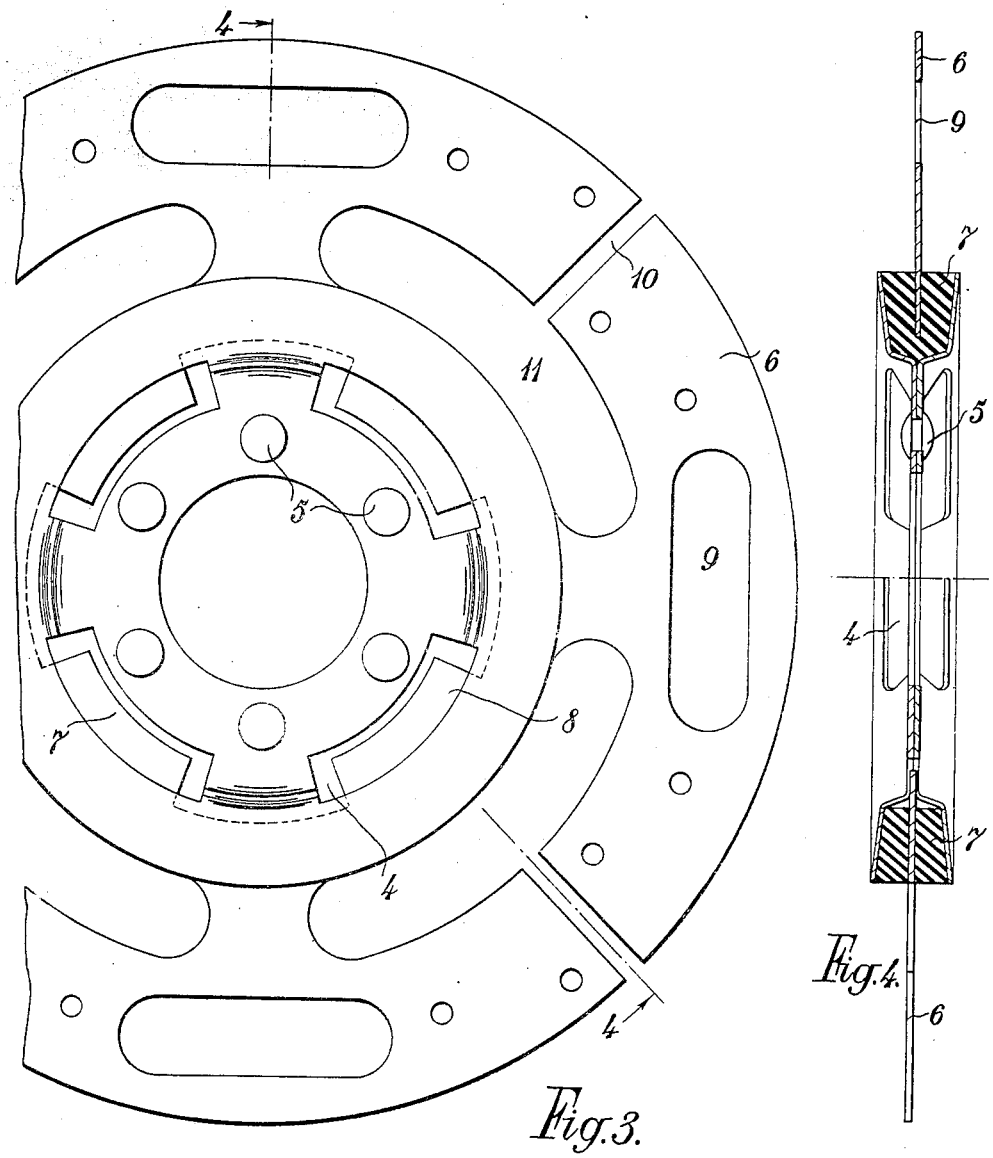
Figure 3 is a front elevation of a resilient disk assembly.
Figure 4 is a section on line 4—4 of Figure 1.

The dished plates are secured together in pairs back to back as shown in Figure 4, fixing means such as rivets 5 being provided for this purpose.

Arranged within the space provided by the rim portions 1 of the plates is a flat annular disk 6 which is imbedded in a filling of rubber or other resilient material 7. The rubber filling adheres to the surface of the dished plates and disk and supports the latter in the position shown in Figure 4.

The disk 6 is formed with a number of lugs 8 which extend inwardly into the openings 4 of the plates, the width of the lugs 7 in relation to the openings 4 being such as to leave a space between them which permits of a fairly large amount of angular play in a circumferential direction. This arrangement provides a driving connection of a positive character between the plates and disk in the event of failure or rupture of the elastic material.

The disk 6 is provided with a number of openings 9 for securing it to one member of a coupling whilst radial openings 10 merging into other openings 11 impart to the disk a degree of resiliency in an axial direction. The inner flat surface 2 of the dished plates provides a means of connection to the other member of a transmission coupling.

In a modified form of the invention as illustrated in Figures 5 and 6, a dished plate 12 of substantially similar construction to that of Figures 1 and 2 is shown in a transmission coupling assembly. The plate 12 is secured by rivets 13 to an annular ring 14 having a sloping side face 15, the ring being in turn secured by means of bolts 16 to a flanged coupling member 17.

An annular disk 18 of similar form to that shown in Figures 4 and 5 extends into the rubber filling 19 and is provided with lugs 20 situated in segmental openings 21 in the plate 12.

The disk 18 is secured by bolts 22 to the flange 23 of a coupling member 24 arranged in axial alignment with the coupling member 17.

This form of coupling may be utilized in forming the driving connection between two aligned shafts, provision being made in the members 17 and 24 for keying them to the adjacent ends of the shafts. When desired the two halves of the coupling may be separated by undoing the bolts 22 and removing the split ring or distance piece 25.

Figure 7:
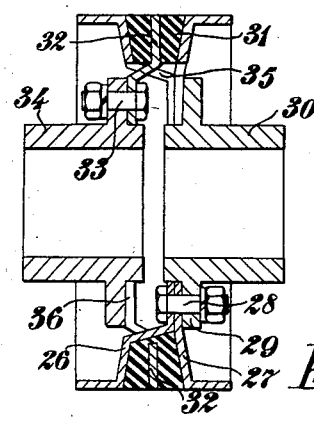
Figure 7 is a sectional view of a further modification of the invention.

In the form of the invention shown in Figure 7 two dished plates 26 and 27 are provided which are attached by bolts 28 to the flange 29 of a coupling member 30. Between the outer peripheries of the plates is a rubber or other filling 31 into which extends a disk 32 which is secured by bolts 33 to the flanged coupling member 34. To enable the disk 32 to be assembled in the position shown, inwardly extending openings 35 and 36 are provided in the members 26 and 32 respectively. This arrangement is similar to the other forms of coupling disk already described insofar as a positive drive will be obtained by the inter-engagement of the plate and disk members in the event of the rubber filling rupturing so that the disk will still serve to transmit the drive from one coupling member to the other.

Figure 8:
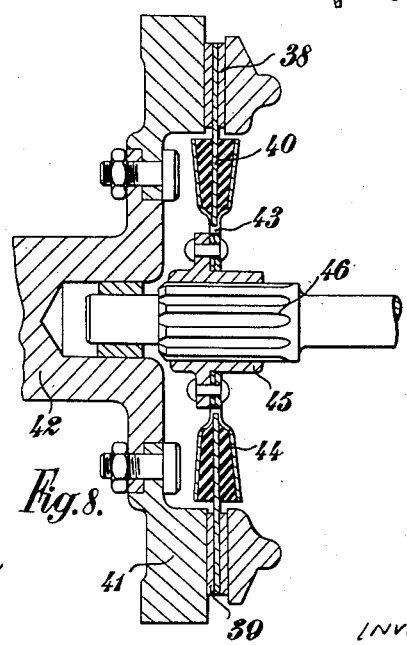
Figure 8 is a sectional view of a further modification showing the invention in use with a clutch.

The invention is shown in Figure 8 applied to a clutch. In this form friction linings 38 and 39 are secured to the outer zone of the disk 40 and engage the clutch member 41 which is rigid with the shaft 42. The dished plate members 43 carrying the resilient filling 44 are secured to a flanged sleeve 45 mounted on a spindled shaft 46. Owing to its vibration absorbing properties such defects as clutch chatter will be entirely eliminated and also some gear-box and back-axle noises due to vibrations and Cardan shaft torque reaction will disappear.

In certain cases also when applied to automobile clutches the resilient transmission disk 10 will render engine crank-shaft vibration dampers unnecessary.

It will be understood that any suitable adhesive may be employed between the rubber or resilient filling and the metallic faces of the members with which it is in contact and the use of an adhesive may be preferred to mere frictional contact between adjacent surfaces.

We claim:

1. A resilient transmission disk comprising an annular member having a central opening and spaced lugs extending inwardly thereof in the plane of the annular member, dished plate means having segmental openings receiving said lugs, a filling of resilient material interposed between said annular member and said dished plate means, the segmental openings in said dished plate means being of greater angular width than the spaced lugs of the annular member.

2. A resilient transmission disk comprising an annular member oppositely facing dished plates, the inner portions of which are in abutting relation arranged about the inner portion of said annular member and forming an annular peripheral pocket, a continuous ring of resilient material in said pocket adhering to said annular member, openings formed in said dished plates and means on said annular member extending into said openings.

3. The device as claimed in claim 2, in which the means on said annular member extending into said openings lies in the plane of the annular member.

JEAN FELIX PAULSEN.
NIKITA STRACHOVSKY.